3,376,084
DENTAL HANDPIECE
Lewis W. McKee, Brookfield Center, Conn., assignor to The Barden Corporation, Danbury, Conn., a corporation of Connecticut
Filed Jan. 7, 1965, Ser. No. 423,955
4 Claims. (Cl. 308—184)

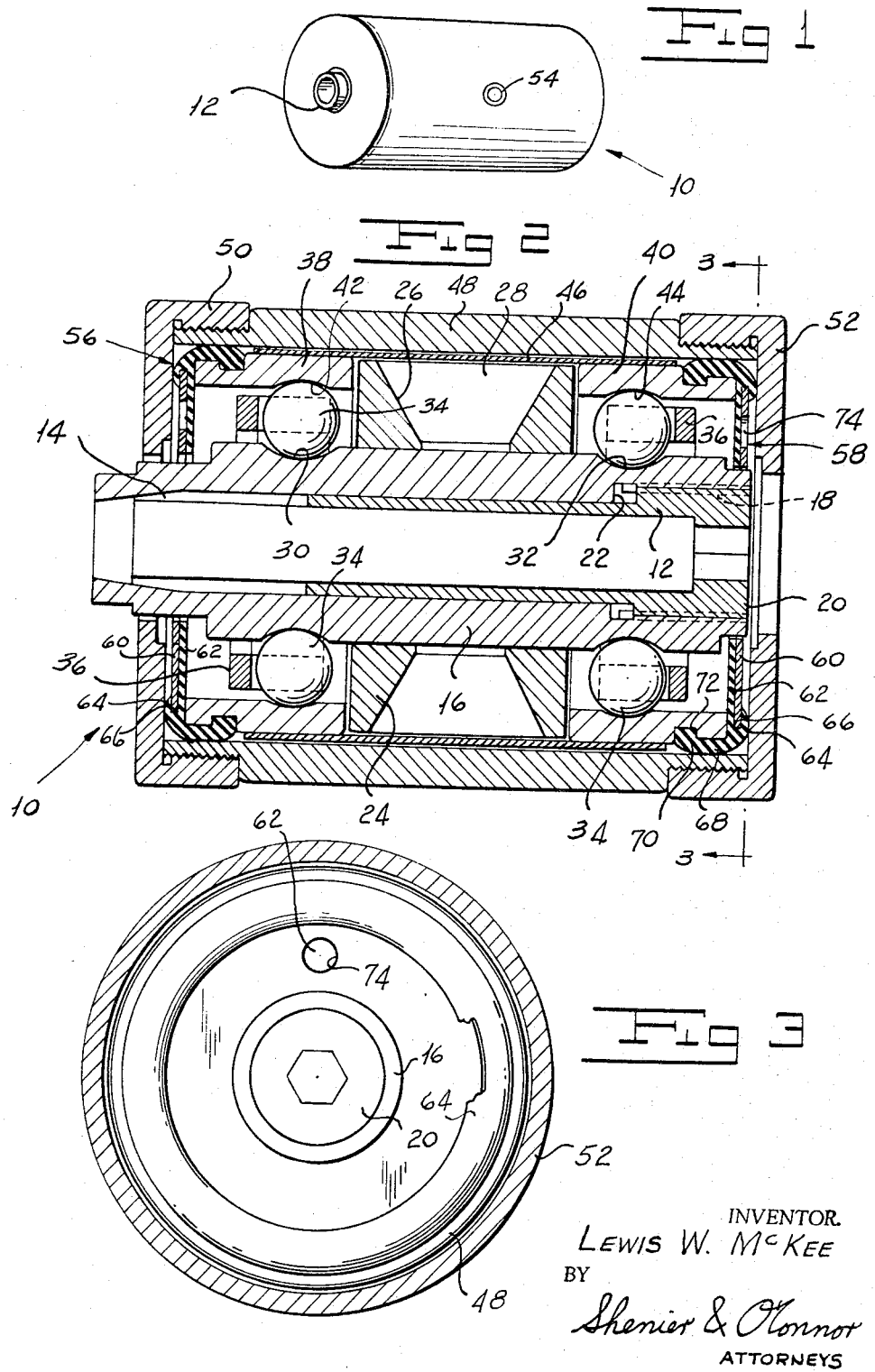

My invention relates to an improved dental handpiece and more particularly to a dental handpiece which has a longer life and which is smoother and quieter in operation than are dental handpieces of the type presently known.

There are known dental handpieces for supporting and driving tools, such as drills and burrs and the like, in which a tool-receiving element such as a collet is carried by a shaft which is rotatably supported in the handpiece housing by spaced bearings. In one form of such dental handpiece the collet-carrying shaft supports an air turbine rotor for rotation therewith. In operation of the handpiece air under pressure supplied thereto drives the turbine to rotate the tool.

In the arrangements known in the art the outer rings of the spaced bearings are supported directly on the handpiece housing while the inner rings are secured to the shaft carrying the collet. This arrangement incorporates a number of defects. Axial adjustment of the spacing between the bearings is difficult with the result that the bearings may be either too loose or too tight, both of which conditions cause an inordinate amount of vibration and wear.

Inherent in arrangements of the type presently used is vibration resulting from eccentricities between the tool and the collet mounting which cause unbalance. The ball bearings themselves generate vibration. Moreover, unbalanced forces in the air turbine are transmitted through the bearings to the handpiece. The inherent radial unbalanced loading from the collet and burr arrangement, together with the very high operating speeds of from about 300,000 to about 400,000 r.p.m. results in short fatigue life of the handpiece.

I have invented an improved dental handpiece which overcomes the defects of handpieces pointed out hereinabove. My dental handpiece is smoother and quieter in operation than are handpieces now in use. My handpiece has a longer fatigue life than do presently known handpieces. It is readily assembled with the proper axial adjustment of the outer races of the spaced bearings. My assembly is simpler than are assemblies of the prior art. It may readily be lubricated with this operation necessitating removal of only the end caps of the assembly.

One object of my invention is to provide an improved dental handpiece which overcomes the defects of handpieces of the prior art.

Another object of my invention is to provide an improved dental handpiece which is smoother and quieter in operation than are handpieces now in use.

A further object of my invention is to provide an improved dental handpiece having a longer fatigue life than do handpieces presently known.

Still another object of my invention is to provide an improved dental handpiece which is simple in construction.

Yet another object of my invention is to provide an improved dental handpiece which is easily lubricated.

Other and further objects of my invention will appear from the following description.

In general my invention contemplates the provision of an improved dental handpiece in which outer bearing rings supported in spaced relationship by a thin sleeve adhered to the rings have raceways which cooperate with spaced raceways integrally formed with the collet-supporting shaft. Respective resilient damper and shield members support the assembly of the shaft and bearings in the handpiece housing to absorb both radial and axial loads.

In the accompanying drawings which form part of the instant specification and which are to be read in conjunction therewith and in which like reference numerals are used to indicate like parts in the various views:

FIGURE 1 is a perspective view of my improved dental handpiece.

FIGURE 2 is a sectional view of my improved dental handpiece.

FIGURE 3 is a sectional view of my improved dental handpiece taken along the line 3—3 of FIGURE 2.

Referring now to the drawings, my improved dental handpiece indicated generally by the reference character 10 comprises a tool-supporting element such as a collet 12, one end of which is provided with slots 14 frictionally to clamp a tool such as a burr or drill inserted into the collet 12. A hollow shaft 16 receives the collet 12 for rotation therewith. I mount collet 12 on the shaft 16 in any suitable manner. For example, threads 18 on a head 20 on the collet engaging complementary threads in the wall of a recess 22 in one end of the shaft 16 may provide a driving connection between the parts. Shaft 16 and the collet 12 may be formed of any suitable material such, for example, as steel or the like.

Shaft 16 carries for rotation therewith an air turbine rotor 24 provided with a plurality of circumferentially spaced pockets 26 formed by blades 28. Air under pressure admitted into the handpiece 10 in a manner to be described hereinafter impinges on the blades 28 to rotate shaft 16. In one specific form of my improved dental handpiece I may form the rotor 24 from aluminum and provide it with six spaced blades 28.

I form the outer surface of shaft 16 with a pair of spaced raceways 30 and 32 adapted to receive rolling elements such as balls 34. Ball retainers 36 formed of a suitable material providing minimum frictional drag and maximum endurance such, for example, as a phenolic or other plastic material, maintain the balls 34 in spaced relationship with respect to the corresponding raceways 30 or 32.

I provide respective outer bearing rings 38 and 40 having raceways 42 and 44 for cooperation with the respective raceways 30 and 32. In order to facilitate the assembly of the spaced bearings with an accurately determined axial spacing of the outer rings 38 and 40 for optimum performance, I provide a thin sleeve 46 for holding the rings in spaced relationship. In achieving this result I apply a suitable bonding material such, for example, as epoxy or any other suitable adhesive to the rings 38 and 40 and position them properly in such axially spaced relationship as will result in avoiding excessive axial looseness or tightness. The assembly of the collet and shaft and its bearings is adapted to be received in the handpiece housing 48, which housing is provided with end caps 50 and 52 adapted to be threaded onto the ends of the housing 48. Housing 48 is provided with a hole 54 for supplying air under pressure to the turbine rotor 24. A similar hole (not shown) permits exhaust. While I preferably bond rings 38 and 40 to the sleeve 46 with an adhesive I may, if desired, assemble the rings on the sleeve with a press fit.

It will be appreciated that the assembly of the outer rings 38 and 40 by means of the thin sleeve 48 renders the axial spacing of the outer rings independent of the housing 48 so that excessive axial looseness or tightness such as is present in many assemblies of the prior art is avoided.

I provide combined vigration dampers and shields indicated generally by the reference characters 56 and 58 for supporting the assembly of the collet, shaft and bearings within the housing 48. Each of the assemblies 56 and 58 comprises a metal ring 60 carried by a vibration absorbing shield and damper 62 formed from a suitable resilient material such, for example, as rubber or the like. Each element 62 is provided with an annular retaining lip 64 forming a pocket 66 in which the associated ring 60 is disposed. I form a peripheral axially extending flange 68 on each of the members 62. An inwardly-extending, annular lip 70 on the flange 68 is adapted to engage a peripheral groove 72 on the corresponding outer ring 38 or 50 to permit the assembly 56 or 58 to be mounted on the ring.

After the combination shield and vibration damping members 56 and 58 have been assembled on the ends of the outer bearing rings 38 and 40, the resultant assembly is placed inside the housing 48 and the end caps 50 and 52 are screwed into place. When this has been done the lips 64 engage the end plates 50 and 52 to absorb axial forces while flanges 68 engage the inner surface of the housing 48 to absorb radial forces. It will readily be appreciated that with the parts thus assembled, some clearance exists between the outer surface of the sleeve 46 and the inner surface of the housing 48.

In assembling the handpiece I prepack each of the bearings with a suitable lubricant such, for example, as a channelling type grease. I form each of the discs 60 with an opening 74 which exposes the member 62 to permit relubrication by the introduction of grease through the member 62 by means of a hypodermic syringe or the like. Alternatively, I may of course use air-oil mist lubrication by mixing oil with the air used to drive the turbine.

In assembling my improved dental handpiece I first mount the collet 12 within the hollow shaft 16. Next I assemble the balls 34, the retainers 36 and the outer rings 38 and 40. I readily predetermine the axial spacing between the outer rings 38 and 40 by bonding them to the thin sleeve 46 in the manner described above. When that has been done, I lubricate the bearings and snap on the combined shields and vibration-absorbing members 56 and 58. This assembly is then placed within the housing 48 and the end caps 50 and 52 are screwed into place. The handpiece now is ready for operation.

In operation of my improved dental handpiece fluid, such as air under pressure, is provided through the fitting 54 to impinge on the blades 28 to drive shaft 16 and collet 12, as well as the tool carried thereby. In the course of operation, any unbalanced forces in a radial direction resulting from the collet and burr attachment will be absorbed by the flanges 68. At the same time axial vibrations are absorbed by flanges 64. When, after a period of time in use, it becomes necessary to replenish the lubricant, this may be done in an expeditious manner by introducing grease through the portion of the members 62 exposed by the opening 74 by means of a hypodermic syringe or the like. It will readily be apparent that this arrangement obviates the necessity for dripping oil into the air which drives the turbine as is presently done in order to replenish the supply of lubricant.

It will be seen that I have accomplished the objects of my invention. I have provided an improved dental handpiece which overcomes the disadvantages of handpieces of the prior art. My dental handpiece is smoother and quieter in operation than are handpieces now in use. It has a relatively long fatigue life. It is simple in construction and may readily be lubricated.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing assembly for use in a dental handpiece having a housing provided with a generally cylindrical side wall and end walls including in combination a shaft, spaced integral bearing raceways carried by said shaft, respective outer bearing rings having raceways associated with said shaft raceways, a thin generally cylindrical sleeve, a bonding material securing said outer rings to said sleeve in predetermined spaced relationship, bearing elements disposed in said raceways to form an assembly, respective disk-like members of resilient material having annular peripheral flanges thereon engaging said rings, respective relatively rigid disks and lips on said disk-like members holding said relatively rigid disks in assembled relationship with said resilient members, said flanges being adapted to engage said side wall to absorb radial thrust and said lips being adapted to engage said end walls to absorb axial thrust to mount said assembly within said housing with said sleeve spaced from said housing side wall.

2. An assembly as in claim 1 wherein said relatively rigid disks have openings to permit access to said resilient disk-like members.

3. A shield and shock absorber for a bearing having an outer ring including in combination a disk-like member of resilient material having an annular peripheral flange thereon engaging the outer periphery of said ring, a relatively rigid disk and a lip on said resilient disk-like member holding said relatively rigid disk in assembled relationship with said resilient member.

4. A shield and shock absorber for a bearing having an outer ring including in combination a disk-like member of resilient material having an annular peripheral flange thereon engaging the outer periphery of said ring, a relatively rigid disk and a lip on said resilient disk-like member holding said relatively rigid disk in assembled relationship with said resilient member, said relatively rigid disk having an opening affording access to said resilient material.

References Cited

UNITED STATES PATENTS

| | | | |
|---|---|---|---|
| 3,134,172 | 5/1964 | Sato | 32—27 |
| 3,175,293 | 3/1965 | Borden | 32—27 |
| 3,218,028 | 11/1965 | Borden | 253—2 |

LOUIS G. MANCENE, *Primary Examiner.*

ROBERT E. MORGAN, *Examiner.*